(12) United States Patent
Fujitomo et al.

(10) Patent No.: US 12,119,445 B2
(45) Date of Patent: Oct. 15, 2024

(54) NON-AQUEOUS ELECTROLYTE SECONDARY BATTERY, ELECTROLYTE SOLUTION, AND METHOD FOR PRODUCING NON-AQUEOUS ELECTROLYTE SECONDARY BATTERY

(71) Applicant: Panasonic Intellectual Property Management Co., Ltd., Osaka (JP)

(72) Inventors: Chisaki Fujitomo, Osaka (JP); Satoshi Nishitani, Osaka (JP); Yasuko Nozaki, Osaka (JP); Masaki Deguchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 950 days.

(21) Appl. No.: 16/966,147

(22) PCT Filed: Jan. 10, 2019

(86) PCT No.: PCT/JP2019/000477
§ 371 (c)(1),
(2) Date: Jul. 30, 2020

(87) PCT Pub. No.: WO2019/150902
PCT Pub. Date: Aug. 8, 2019

(65) Prior Publication Data
US 2021/0036367 A1    Feb. 4, 2021

(30) Foreign Application Priority Data

Jan. 31, 2018  (JP) .................... 2018-014428

(51) Int. Cl.
| | |
|---|---|
| *H01M 10/0567* | (2010.01) |
| *H01M 10/0525* | (2010.01) |
| *H01M 10/0568* | (2010.01) |
| *H01M 10/0569* | (2010.01) |
| *H01M 10/058* | (2010.01) |

(52) U.S. Cl.
CPC ... *H01M 10/0567* (2013.01); *H01M 10/0525* (2013.01); *H01M 10/0568* (2013.01); *H01M 10/0569* (2013.01); *H01M 10/058* (2013.01)

(58) Field of Classification Search
None
See application file for complete search history.

(56) References Cited

U.S. PATENT DOCUMENTS

| | | | | |
|---|---|---|---|---|
| 2003/0180626 | A1* | 9/2003 | Shima | H01M 10/0567 429/231.95 |
| 2004/0096750 | A1 | 5/2004 | Kim et al. | |
| 2004/0170903 | A1 | 9/2004 | Fukuoka et al. | |
| 2007/0009806 | A1* | 1/2007 | Kim | H01M 10/0525 429/200 |
| 2007/0048607 | A1* | 3/2007 | Nakashima | H01M 10/0525 429/251 |
| 2008/0318135 | A1* | 12/2008 | Sung | H01G 11/28 429/231.95 |
| 2009/0017386 | A1* | 1/2009 | Xu | H01M 4/621 29/623.2 |
| 2011/0111305 | A1 | 5/2011 | Jeon et al. | |
| 2012/0164519 | A1* | 6/2012 | Lee | H01M 10/0569 429/163 |
| 2014/0349198 | A1* | 11/2014 | Lim | H01M 4/623 429/330 |
| 2017/0125794 | A1* | 5/2017 | Zhao | H01M 4/5815 |
| 2017/0207459 | A1* | 7/2017 | Okada | H01G 11/60 |
| 2017/0214041 | A1* | 7/2017 | Minami | H01M 4/485 |
| 2017/0214091 | A1* | 7/2017 | Abe | H01G 11/50 |
| 2018/0048020 | A1* | 2/2018 | Zou | H01M 4/364 |
| 2018/0277900 | A1* | 9/2018 | Abe | H01M 4/525 |
| 2018/0287140 | A1* | 10/2018 | Akira | H01M 4/386 |

FOREIGN PATENT DOCUMENTS

| | | | | |
|---|---|---|---|---|
| CN | 1534820 | A | 10/2004 | |
| CN | 101779325 | A | 7/2010 | |
| JP | 2004-172120 | A | 6/2004 | |
| JP | 2010-537369 | A | 12/2010 | |
| JP | 2013-152824 | A | 8/2013 | |
| JP | 2013-251097 | A | 12/2013 | |
| WO | WO-2017051500 | A1 * | 3/2017 | ............. H01M 4/13 |
| WO | WO2017/057588 | | * 4/2017 | |

OTHER PUBLICATIONS

English Translation of Chinese Search Report dated Mar. 23, 2023 for the related Chinese Patent Application No. 201980009634.4. (4 pages).

The Extended (Supplementary) European Search Report dated Feb. 17, 2021, issued in counterpart EP Application No. 19747697.1. (8 pages).

International Search Report dated Apr. 16, 2019, issued in counterpart International Application No. PCT/JP2019/000477 (1 page).

* cited by examiner

*Primary Examiner* — Anca Eoff

(74) *Attorney, Agent, or Firm* — WHDA, LLP

(57) ABSTRACT

Disclosed is a non-aqueous electrolyte secondary battery including: a positive electrode, a negative electrode, a separator interposed between the positive electrode and the negative electrode, and an electrolyte solution, wherein the electrolyte solution includes a solvent, a solute, and a carboxylic anhydride, the solvent includes a carboxylic acid ester compound, and the solute includes a sulfonyl imide compound.

10 Claims, 2 Drawing Sheets ns NON-AQUEOUS ELECTROLYTE SECONDARY BATTERY, ELECTROLYTE SOLUTION, AND METHOD FOR PRODUCING NON-AQUEOUS ELECTROLYTE SECONDARY BATTERY

The instant application is a National Stage filing under 37 CFR 371 of the international application No. PCT/JP2019/000477 filed on Jan. 10, 2019 which claims priority to the application No. 2018-014428 filed on Jan. 31, 2018 in Japan.

TECHNICAL FIELD

The present invention mainly relates to an improvement in an electrolyte solution of a non-aqueous electrolyte secondary battery.

BACKGROUND ART

Non-aqueous electrolyte secondary batteries, in particular, lithium ion secondary batteries have a high voltage and a high energy density, and thus are thought to be promising as the power sources for compact consumer devices, power storage apparatuses, and electric vehicles. The use of a carboxylic acid ester for a solvent of an electrolyte solution is expected to improve the ion conductivity of the electrolyte solution (PTL 1).

CITATION LIST

Patent Literature

[PTL] 1 Japanese Laid-Open Patent Publication No. 2004-172120

SUMMARY OF INVENTION

The use of a carboxylic acid ester for the electrolyte solution of a non-aqueous electrolyte secondary battery results in a reduction in the viscosity of the electrolyte, so that the cycle characteristics at room temperature tend to be improved. On the other hand, the cycle characteristics tend to be reduced at a high temperature of about 45° C.

In view of the foregoing, an aspect of the present invention relates to a non-aqueous electrolyte secondary battery including: a positive electrode, a negative electrode, a separator interposed between the positive electrode and the negative electrode, and an electrolyte solution, wherein the electrolyte solution includes a solvent, a solute, and a carboxylic anhydride, the solvent includes a carboxylic acid ester compound, and the solute includes a sulfonyl imide compound.

Another aspect of the present invention relates to a non-aqueous electrolyte secondary battery including: a positive electrode, a negative electrode, a separator interposed between the positive electrode and the negative electrode, and an electrolyte solution, wherein the electrolyte solution includes a solvent and a solute, the solvent includes a carboxylic acid ester compound, the solute includes a sulfonyl imide compound, and the negative electrode includes a coating derived from a sulfonyl imide compound and a carboxylic anhydride.

Yet another aspect of the present invention relates to an electrolyte solution including: a solvent, a solute, and a carboxylic anhydride, wherein the solvent includes a carboxylic acid ester compound, and the lithium salt includes a sulfonyl imide compound.

Still another aspect of the present invention relates to a method for producing a non-aqueous electrolyte secondary battery, including the steps of: assembling an uncharged battery including a positive electrode, a negative electrode, a separator interposed between the positive electrode and the negative electrode, and the above-described electrolyte solution; and charging the uncharged battery, thereby forming, on the negative electrode, a coating derived from a sulfonyl imide compound and a carboxylic anhydride.

With the non-aqueous electrolyte secondary battery according to the present invention, it is possible to achieve good cycle characteristics even at a high temperature of about 45° C.

DESCRIPTION OF EMBODIMENT

Figure 1:
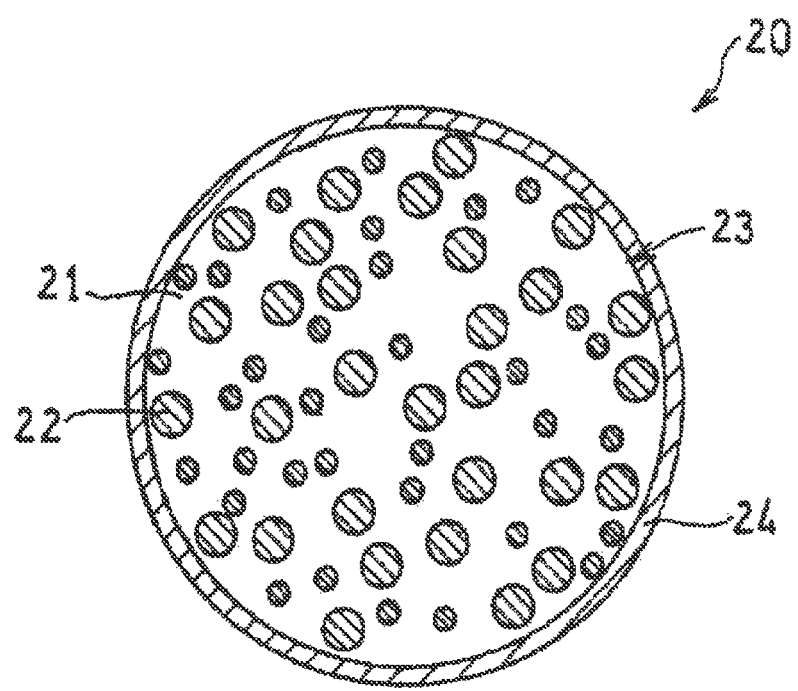
FIG. 1 is a schematic cross-sectional view showing a configuration of an LSX particle according to an embodiment of the present invention.

A non-aqueous electrolyte secondary battery according to an embodiment of the present invention includes: a positive electrode, a negative electrode, a separator interposed between the positive electrode and the negative electrode, and an electrolyte solution, wherein the electrolyte solution includes a solvent, a solute, and a carboxylic anhydride. Here, the solvent includes a carboxylic acid ester compound, and the solute includes a sulfonyl imide compound.

The solvent refers to a cyclic carbonic acid ester, a cyclic carboxylic acid ester, a chain carbonic acid ester, and a chain carboxylic acid ester, as well as an electrolyte solution component that exhibits a liquid state at 25° C. and whose content in the electrolyte solution is 3 mass % or more. The solute refers to an electrolyte salt that ionically dissociates in the electrolyte solution. The electrolyte solution may include various additives. Components other than the solvent and the solute are additives, and the carboxylic anhydride is classified as an additive. Note that a polymer that exhibits a solid state at 25° C. alone is not included in the electrolyte solution component even if its content in the electrolyte solution is 3 mass % or more. Such a polymer functions as a matrix that causes gelation of the electrolyte solution.

The carboxylic acid ester reduces the viscosity of the electrolyte solution, and therefore is effective for improving the cycle characteristics at room temperature. On the other hand, at a high temperature of about 45° C., the decomposition of the electrolyte solution including a carboxylic acid ester is likely to proceed, so that the cycle characteristics tend to be reduced.

In this respect, when an electrolyte solution including a carboxylic anhydride and not including a sulfonyl imide compound is used, the carboxylic anhydride forms a dense and strong organic coating (hereinafter referred to as a "coating A") on the negative electrode surface. Although the decomposition of the electrolyte solution can be inhibited by the coating A, the reaction resistance becomes very high, and it is therefore difficult to sufficiently improve the capacity retention rate.

When an electrolyte solution including a sulfonyl imide compound and not including a carboxylic anhydride is used, the sulfonyl imide compound forms a coarse coating (hereinafter referred to as a "coating B") on the negative electrode surface. The coating B may be an inorganic coating. Although the decomposition of the electrolyte solution can be inhibited to some extent by the coating B, the coating B itself is brittle, and it is therefore still difficult to sufficiently improve the capacity retention rate. In addition, although the influence is smaller than that of the coating A, the reaction resistance is also increased.

On the other hand, when the electrolyte solution includes both a carboxylic anhydride and a sulfonyl imide compound, a hybrid coating having a reaction resistance significantly smaller than that of the coating A and also smaller than that of the coating B is formed on the negative electrode surface. It can be considered that the coarse and brittle coating B is appropriately reinforced by the coating component derived from the carboxylic anhydride, so that a flexible coating structure having a composition and a density significantly different from those of the coatings A and B is formed. In addition to having excellent lithium ion diffusivity and low reaction resistance, the hybrid coating sufficiently inhibits the reductive decomposition of the electrolyte solution (in particular, a carboxylic acid ester) on the negative electrode surface even at a high temperature of about 45° C. Furthermore, the flexible hybrid coating can easily follow the expansion and contraction of the negative electrode, and improves the permeability of the low-viscosity electrolyte solution, and also is less likely to peel off. Accordingly, by including a carboxylic anhydride and a sulfonyl imide compound in the electrolyte solution, it is possible to achieve very good cycle characteristics even at a high temperature of about 45° C.

The hybrid coating is formed on the negative electrode surface when charging an uncharged battery including an electrolyte solution including both a carboxylic anhydride and a sulfonyl imide compound. Accordingly, the non-aqueous electrolyte secondary battery according to the present invention can be obtained by a production method including the steps of: assembling an uncharged battery including a positive electrode, a negative electrode, a separator interposed between the positive electrode and the negative electrode, and an electrolyte solution including both a carboxylic anhydride and a sulfonyl imide compound; and charging the uncharged battery.

In the electrolyte solution before being injected into the battery, the content of the carboxylic anhydride is preferably 3 mass % or less, and more preferably 1 mass % or less. The reason is that a high-quality hybrid coating having low reaction resistance is more likely to be formed. From the same viewpoint, the content of the carboxylic anhydride in the electrolyte solution before being injected into the battery is preferably 0.01 mass % or more, and more preferably 0.05 mass % or more.

The content of the carboxylic anhydride in the electrolyte solution can be measured by analyzing the electrolyte solution by gas chromatography.

At least a part of the carboxylic anhydride in the electrolyte solution introduced into the battery is oxidized or reduced when charging/discharging the battery, and is used for the formation of a hybrid coating. Accordingly, the content of the carboxylic anhydride in the electrolyte solution included in the battery is also preferably 3 mass % or less, for example, preferably 0.5 mass % or less, and more preferably 0.1 mass % or less. The content of the carboxylic anhydride in the electrolyte solution collected from the battery is, for example, 0.01 mass % or more, or may be a very small content of less than 0.01 mass %. However, at least the presence thereof can be confirmed by analyzing the electrolyte solution by gas chromatography.

When the carboxylic anhydride is added in a trace amount to the electrolyte solution, most of the carboxylic anhydride may be consumed for the formation of a hybrid coating, as a result of which a hybrid coating derived from a sulfonyl imide compound and a carboxylic anhydride is formed on the negative electrode surface. Even when the electrolyte solution in the battery does not include a carboxylic anhydride, if the negative electrode includes a hybrid coating derived from a sulfonyl imide compound and a carboxylic anhydride, such an embodiment is included within the present invention.

The proportion of the carboxylic acid ester compound in the solvent is preferably 5 vol % or more and 80 vol % or less, and more preferably 20 vol % or more and 45 vol % or less. The reason is that the viscosity of the electrolyte solution can be sufficiently reduced, and the cycle characteristics can be easily improved.

Examples of the carboxylic anhydride include, but are not particularly limited to, acetic anhydride, propionic anhydride, oxalic anhydride, succinic anhydride, maleic anhydride, phthalic anhydride, benzoic anhydride, and diglycolic anhydride. Of these, it is preferable to use at least one selected from the group consisting of succinic anhydride, maleic anhydride, and diglycolic anhydride, since a dense and strong coating may be formed. The proportion of these materials in the carboxylic anhydride is preferably 90 mass % or more, and at least one selected from the group consisting of succinic anhydride, maleic anhydride and diglycolic anhydride may constitute 100% of the carboxylic anhydride.

From the viewpoint of forming a hybrid coating with a higher quality and increasing the ion conductivity of the electrolyte solution, the content of the sulfonyl imide compound in the electrolyte solution may be 0.1 mol/L to 1.5 mol/L, and is preferably 0.2 mol/L to 1 mol/L.

Examples of the sulfonyl imide compound include, but are not particularly limited to, lithium bis(fluorosulfonyl) imide: $LiN(SO_2F)_2$ (hereinafter also referred to as LFSI), lithium bis(trifluoromethylsulfonyl)imide: $LiN(CF_3SO_2)_2$, and lithium(fluorosulfonyl)(trifluoromethylsulfonyl)imide: $LiN(SO_2F)(CF_3SO_2)$. Of these, LFSI is particularly preferable. The proportion of LFSI in the sulfonyl imide compound is preferably 90 mol % or more, and LFSI may constitute 100% of the sulfonyl imide compound.

From the viewpoint of reducing the viscosity and improving the conductivity of the electrolyte solution, it is preferable to use a lower ester compound represented by $R^1CO-OR^2$ as the carboxylic acid ester compound, and the lower ester compound may constituted 90 mass % or more of the carboxylic acid ester compound. Here, $R^1$ may be a hydrogen atom (H) or an alkyl group having 1 to 3 carbon atoms, and $R^2$ may be an alkyl group having 1 to 3 carbon atoms. Specific examples of the carboxylic acid ester compound include methyl formate, ethyl formate, propyl formate, methyl acetate, ethyl acetate, propyl acetate, methyl propionate, ethyl propionate, and propyl propionate.

The negative electrode may include a composite material (hereinafter referred to as a "negative electrode material LSX", or also simply referred to as "LSX") containing a lithium silicate phase and silicon particles dispersed in the lithium silicate phase. The higher the content of the silicon particles in the negative electrode material LSX, the larger the capacity of the negative electrode becomes. However, when the content of the silicon particles in the negative electrode material LSX increases, the alkali component may dissolve out of the negative electrode. The alkali component may promote the decomposition reaction of the electrolyte solution (e.g., the carboxylic acid ester compound). In this respect, when the electrolyte solution includes the carboxylic anhydride and the sulfonyl imide compound, a hybrid coating is formed on the negative electrode surface, so that the decomposition reaction of the electrolyte solution is sufficiently inhibited.

Preferably, the lithium silicate phase has a composition formula represented by $Li_ySiO_z$, and satisfies $0<y\leq8$ and $0.5\leq z\leq6$. A lithium silicate phase having a composition formula represented by $Li_{2u}SiO_{2+u}$ ($0<u<2$) is more preferable.

A lithium silicate phase has a smaller number of sites that can react with lithium, as compared with $SiO_x$, which is a composite of $SiO_2$ and fine silicon, and thus is less prone to cause an irreversible capacity due to charge/discharge. In the case of dispersing silicon particles in a lithium silicate phase, an excellent charging/discharging efficiency can be achieved at the initial stage of charge/discharge. In addition, the content of the silicon particles can be freely changed, and it is thus possible to design a negative electrode having a high capacity.

The crystallite size of the silicon particles dispersed in the lithium silicate phase is, for example, 5 nm or more. The silicon particles have a particulate phase of a simple substance of silicon (Si). When the crystallite size of the silicon particles is 5 nm or more, the surface area of the silicon particles can be kept small, and therefore the degradation of the silicon particles, which is accompanied by the generation of an irreversible capacity, is less likely to occur. The crystallite size of the silicon particles is calculated from the half-width of a diffraction peak attributed to the Si (111) plane in an X-ray diffraction (XRD) pattern of the silicon particles, using the Scherrer equation.

The negative electrode material LSX is also excellent in structural stability. The reason is that the expansion and contraction of the negative electrode material LSX due to charge/discharge is suppressed since the silicon particles are dispersed in the lithium silicate phase. From the viewpoint of suppressing the cracking of the silicon particles, the silicon particles have an average particle size of preferably 500 nm or less, more preferably 200 nm or less, and further preferably 50 nm or less, before initial charging. After initial charging, the silicon particles have an average particle size of preferably 400 nm or less, and more preferably 100 nm or less. By refining the silicon particles, the volume change due to charge/discharge is reduced, and the structural stability of the negative electrode material LSX is further improved.

The average particle size of the silicon particles is measured by observing a cross-sectional SEM (Scanning Electron Microscope) photograph of the negative electrode material LSX. Specifically, the average particle size of the silicon particles is determined by averaging the maximum diameters of arbitrarily selected 100 silicon particles. The silicon particles are formed by a plurality of crystallites gathering together.

From the viewpoint of increasing the capacity, the content of the silicon particles in the negative electrode material LSX may be, for example, 30 mass % or more, and is preferably 35 mass % or more. This results in good lithium ion diffusivity, making it possible to easily achieve excellent load characteristics. On the other hand, from the viewpoint of improving the cycle characteristics, the content of the silicon particles in the negative electrode material LSX is preferably 95 mass % or less, and more preferably 75 mass % or less. The reason is that the surface of the silicon particles that is exposed without being covered by the lithium silicate phase is reduced, so that a side reaction between the electrolyte solution and the silicon particles is likely to be inhibited.

The content of the silicon particles can be measured by Si-NMR. In the following, desirable measurement conditions for Si-NMR will be described.

Measurement apparatus: a solid-state nuclear magnetic resonance spectrometer (INOVA-400), manufactured by Varian Inc.
Probe: Varian 7 mm CPMAS-2
MAS: 4.2 kHz
MAS rate: 4 kHz
Pulse: DD (45° pulse+signal acquisition time 1H decoupling)
Repetition time: 1200 sec
Observation width: 100 kHz
Center of observation: approximately −100 ppm
Signal acquisition time: 0.05 sec
Number of times of integrations: 560
Sample amount: 207.6 mg The composition of the lithium silicate phase $Li_ySiO_z$ can be analyzed, for example, in the following manner.

First, the mass of a sample of the negative electrode material LSX is measured. Thereafter, the contents of carbon, lithium, and oxygen that are included in the sample are calculated in the following manner. Next, the carbon content is subtracted from the mass of the sample, the lithium content and the oxygen content in the remaining amount are calculated, and the ratio of y and z is determined from the molar ratio of lithium (Li) and oxygen (O).

The carbon content is measured using a carbon-sulfur analyzer (e.g., EMIA-520 manufactured by HORIBA, Ltd.). A measured amount of the sample is placed on a magnetic board, to which a combustion assistant is then added, and the magnetic board is inserted in a combustion furnace (carrier gas: oxygen) heated to 1350° C., and the amount of the carbon dioxide gas generated during combustion is detected by infrared absorption. A calibration curve is formed using, for example, carbon steel (carbon content: 0.49%) manufactured by Bureau of Analysed Samples. Ltd., and the carbon content of the sample is calculated (high-frequency induction heating furnace combustion-infrared absorption method).

The oxygen content is measured using an oxygen-nitrogen-hydrogen analyzer (e.g., EGMA-830 manufactured by HORIBA, Ltd.). The sample is placed in a Ni capsule, which is then introduced, together with a Sn pellet and a Ni pellet that will form flux, into a carbon crucible heated with a power of 5.75 kW, and the carbon monoxide gas released is detected. A calibration curve is formed using a standard sample $Y_2O_3$, and the oxygen content of the sample is calculated (inert gas fusion-nondispersive infrared absorption).

The lithium content is measured by entirely dissolving the sample in hot hydrofluoric-nitric acid (a heated acid mixture of hydrofluoric acid and nitric acid), and removing the carbon in the dissolution residue by filtration, followed by analyzing the resulting filtrate by inductively coupled plasma emission spectrometry (ICP-AES). A calibration curve is formed using a commercially available standard solution of lithium, and the lithium content of the sample is calculated.

The amount obtained by subtracting the carbon content, the oxygen content, and the lithium content from the mass of the sample of the negative electrode material LSX is the silicon content. The silicon present in the form of silicon particles and the silicon present in the form of lithium silicate both contribute to this silicon content. The content of the silicon particles is determined by Si-NMR measurement, so that the content of the silicon present in the form of lithium silicate in the negative electrode material is determined.

It is preferable that the negative electrode material LSX forms a particulate material (hereinafter also referred to as "LSX particles") having an average particle size of 1 to 25 μm, and more preferably 4 to 15 μm. With the above-described particle size range, the stress caused by a volume change of the negative electrode material LSX due to charge/discharge can be easily reduced, thus making it possible to easily achieve good cycle characteristics. The LSX particles also have an appropriate surface area, so that the capacity decrease caused by a side reaction with the non-aqueous electrolyte is also inhibited.

The average particle size of the LSX particles means a particle size (volume average particle size) with which an accumulated volume value is 50% in a particle size distribution measured by laser diffraction/scattering. As the measurement apparatus, it is possible to use, for example, an "LA-750" manufactured by HORIBA, Ltd. (HORIBA).

Preferably, the LSX particles include a conductive material that coats at least a portion of the surfaces thereof. Due to the poor electron conductivity of the lithium silicate phase, the conductivity of the LSX particles also tend to be low. The conductivity can be dramatically increased by coating the surfaces of the LSX particles with the conductive material. Preferably, the conductive layer has a thickness small enough not to substantially affect the average particle size of the LSX particles.

FIG. 1 schematically shows a cross section of an LSX particle 20 as an example of the negative electrode material LSX.

The LSX particle 20 includes a lithium silicate phase 21 and silicon particles 22 dispersed in the lithium silicate phase, and a conductive layer 24 is formed on the surface of a base particle 23 composed of the lithium silicate phase 21 and the silicon particles 22. The conductive layer 24 is formed of a conductive material that coats at least a portion of the surface of the LSX particle or the base particle 23.

The base particle 23 has, for example, an island-in-the-sea structure, in which fine silicon (simple substance of Si) particles 22 are substantially uniformly scattered in the matrix of the lithium silicate phase 21 on a given cross section, without being unevenly distributed in a partial region.

Preferably, the lithium silicate phase 21 is composed of particles that are finer than the silicon particles 22. In this case, in an X-ray diffraction (XRD) pattern of the LSX particle 20, the diffraction peak intensity attributed to the (111) plane of the simple substance of Si is higher than the diffraction peak intensity attributed to the (111) plane of the lithium silicate.

Next, a non-aqueous electrolyte secondary battery according to an embodiment of the present invention will be described in detail. The non-aqueous electrolyte secondary battery includes, for example, a negative electrode, a positive electrode, and a non-aqueous electrolyte as described below.

[Negative Electrode]

The negative electrode includes, for example, a negative electrode current collector, and a negative electrode material mixture layer formed on the surface of the negative electrode current collector and including a negative electrode active material. The negative electrode material mixture layer can be formed by applying, to the surface of the negative electrode current collector, a negative electrode slurry in which the negative electrode material mixture is dispersed in a dispersing medium, and drying the slurry. The coated film obtained after drying may be optionally rolled. The negative electrode material mixture layer may be formed on one surface of the negative electrode current collector, or may be formed on both surfaces thereof.

The negative electrode material mixture includes a negative electrode active material as an essential component, and may include a binder, a conductive agent, a thickener, and the like as optional components.

From the viewpoint of increasing the capacity of the negative electrode, it is preferable that the negative electrode active material includes the negative electrode material LSX. However, the negative electrode material LSX undergoes volume expansion and contraction due to charge/discharge, and, therefore, when the ratio thereof in the negative electrode active material increases, a contact failure between the negative electrode active material and the negative electrode current collector is likely to occur due to charge/discharge. Therefore, in the case of using the negative electrode material LSX as the negative electrode active material, it is preferable that a carbon material that electrochemically absorbs and desorbs lithium ion is used in combination therewith. By using the negative electrode material LSX and the carbon material in combination, it is possible to achieve excellent cycle characteristics, while providing the negative electrode with the high capacity of the silicon particles. The ratio of the negative electrode material LSX to the total amount of the negative electrode material LSX and the carbon material is preferably 3 to 30 mass %, for example. This makes it even easier to achieve both a high capacity and an improvement in cycle characteristics.

Examples of the carbon material include graphite, graphitizable carbon (soft carbon), and hardly graphitizable carbon (hard carbon). Among these, graphite is preferable because of exhibiting excellent charge/discharge stability and also having a small irreversible capacity. Graphite means a material having a graphite crystal structure, and includes, for example, natural graphite, artificial graphite, and graphitized mesophase carbon particles. The carbon materials may be used alone or in a combination of two or more.

A non-porous conductive substrate (a metal foil, etc.) or a porous conductive substrate (a mesh structure, a net structure, a punched sheet, etc.) is used as the negative electrode current collector. Examples of the material of the negative electrode current collector include stainless steel, nickel, a nickel alloy, copper, and a copper alloy. The thickness of the negative electrode current collector is, but is not particularly limited to, preferably 1 to 50 nm, and more preferably 5 to 20 nm, from the viewpoint of the balance between the strength and the weight reduction of the negative electrode.

Examples of the binder include resin materials, including, for example, fluorocarbon resins such as polytetrafluoroethylene and polyvinylidene fluoride (PVDF); polyolefin resins such as polyethylene and polypropylene; polyamide resins such as aramid resin; polyimide resins such as polyimide and polyamide imide; acrylic resins such as polyacrylic acid, polymethyl acrylate, and ethylene-acrylic acid copolymers; vinyl resins such as polyacrylonitrile and polyvinyl acetate; polyvinyl pyrrolidone; polyether sulfone; and rubber-like materials such as a styrene-butadiene copolymer rubber (SBR). These may be used alone or in a combination of two or more.

Examples of the conductive agent include carbon blacks such as acetylene black; conductive fibers such as carbon fiber and metal fiber; carbon fluoride; metal powders such as aluminum powder; conductive whiskers such as zinc oxide and potassium titanate; conductive metal oxides such as titanium oxide; and organic conductive materials such as phenylene derivatives. These may be used alone or in a combination of two or more.

Examples of the thickener include cellulose derivatives (cellulose ether, etc.), including, for example, carboxymethyl cellulose (CMC) and modified products thereof (also including salts such as a Na salt), and methylcellulose; saponified products of polymers having vinyl acetate units such as polyvinyl alcohol; and polyethers (polyalkylene oxides such as polyethylene oxide, etc.). These may be used alone or in a combination of two or more.

Examples of the dispersing medium include, but are not particularly limited to, water, alcohols such as ethanol, ethers such as tetrahydrofuran, amides such as dimethylformamide, N-methyl-2-pyrrolidone (NMP), and solvent mixtures thereof.

[Positive Electrode]

The positive electrode includes, for example, a positive electrode current collector, and a positive electrode material mixture layer formed on the surface of the positive electrode current collector. The positive electrode material mixture layer can be formed by applying, to the surface of the positive electrode current collector, a positive electrode slurry in which the positive electrode material mixture is dispersed in a dispersing medium, and drying the slurry. The coated film obtained after drying may be optionally rolled. The positive electrode material mixture layer may be formed on one surface of the positive electrode current collector, or may be formed on both surfaces thereof.

A lithium composite metal oxide can be used as the positive electrode active material. Examples thereof include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, $Li_2MPO_4F$ (M is at least one of Na, Mg, Sc, Y, Mn, Fe, Co, Ni, Cu, Zn, Al, Cr, Pb, Sb, and B). Here, a=0 to 1.2, b=0 to 0.9, c=2.0 to 2.3. Note that the value "a", which represents the molar ratio of lithium, is a value obtained immediately after the fabrication of the active material, and increases or decreases through charge/discharge.

Among these, it is preferable to use a lithium nickel composite oxide represented by $Li_aNi_bM_{1-b}O_2$ (M is at least one selected from the group consisting of Mn, Co, and Al, 0<a≤1.2, 0.3≤b≤1). From the viewpoint of increasing the capacity, it is preferable that 0.85≤b≤1 is satisfied. Furthermore, from the viewpoint of the stability of the crystal structure, it is more preferable to use $Li_aNi_bCo_cAl_dO_2$ (0<a≤1.2, 0.85≤b<1, 0<c<0.15, 0<d≤0.1, b+c+d=1) including Co and Al as M.

As the binder and the conductive agent, those given as the examples for the negative electrode can be used. As the conductive agent, graphite such as natural graphite or artificial graphite may be used.

The shape and the thickness of the positive electrode current collector can be respectively selected from the shape and the range corresponding to the negative electrode current collector. Examples of the material of the positive electrode current collector include stainless steel, aluminum, an aluminum alloy, and titanium.

[Electrolyte Solution]

The electrolyte solution includes a solvent, a solute, and a carboxylic anhydride, the solvent includes a carboxylic acid ester compound, and the solute includes a sulfonyl imide compound.

The concentration of the solute in the electrolyte solution is, for example, preferably 0.5 mol/L or more and 2 mol/L or less, and more preferably 1 mol/L or more and 1.5 mol/L or less. By controlling the solute concentration within the above-described range, it is possible to obtain an electrolyte solution having excellent ion conductivity and suitable viscosity. However, the solute concentration is not limited to the above examples.

The proportion of the sulfonyl imide compound in the solute may be, for example, 7 mol % or more and 75 mol % or less, and is preferably 10 mol % or more and 60 mol % or less, and more preferably 15 mol % or more and 55 mol % or less.

As the solute other than the sulfonyl imide compound, it is possible to use, for example, lithium salts of chlorine-containing acid ($LiClO_4$, $LiAlCl_4$, $LiB_{10}Cl_{10}$, etc.), lithium salts of fluorine-containing acid ($LiPF_6$, $LiBF_4$, $LiSbF_6$, $LiAsF_6$, $LiCF_3SO_3$, $LiCF_3CO_2$, etc.), and lithium halides (LiCl, LiBr, LiI, etc.). These may be used alone or in a combination of two or more. Among these, $LiPF_6$ is preferable.

The proportion of the total amount of the sulfonyl imide compound (in particular, LFSI) and $LiPF_6$ in the solute is preferably 80 mol % or more, and more preferably 90 mol % or more. By controlling the proportion of the sulfonyl imide compound (in particular, LFSI) and $LiPF_6$ within the above-described range, a battery having excellent long-term cycle characteristics can be achieved easily.

Other than the carboxylic acid ester compound, it is possible to use, for example, a cyclic carbonic acid ester, a chain carbonic acid ester, and a cyclic carboxylic acid ester as the solvent. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). The solvents may be used alone or in a combination of two or more.

[Separator]

Usually, it is desirable that a separator is interposed between the positive electrode and the negative electrode. The separator has a high ion permeability, as well as suitable mechanical strength and insulating properties. As the separator, it is possible to use a microporous thin film, a woven fabric, a non-woven fabric, and the like. Polyolefins such as polypropylene and polyethylene are preferable as the material of the separator.

Examples of the structure of the non-aqueous electrolyte secondary battery include a structure in which an electrode group formed by winding a positive electrode and a negative electrode with a separator interposed therebetween, and a non-aqueous electrolyte are housed in an outer case. Alternatively, an electrode group having another configuration, such as a stacked electrode group formed by stacking a positive electrode and a negative electrode with a separator interposed therebetween, may be used in place of the wound electrode group. For example, the non-aqueous electrolyte secondary battery may have any configuration such as a cylindrical configuration, a prismatic configuration, a coin configuration, a button configuration, and a laminated configuration.

Figure 2:
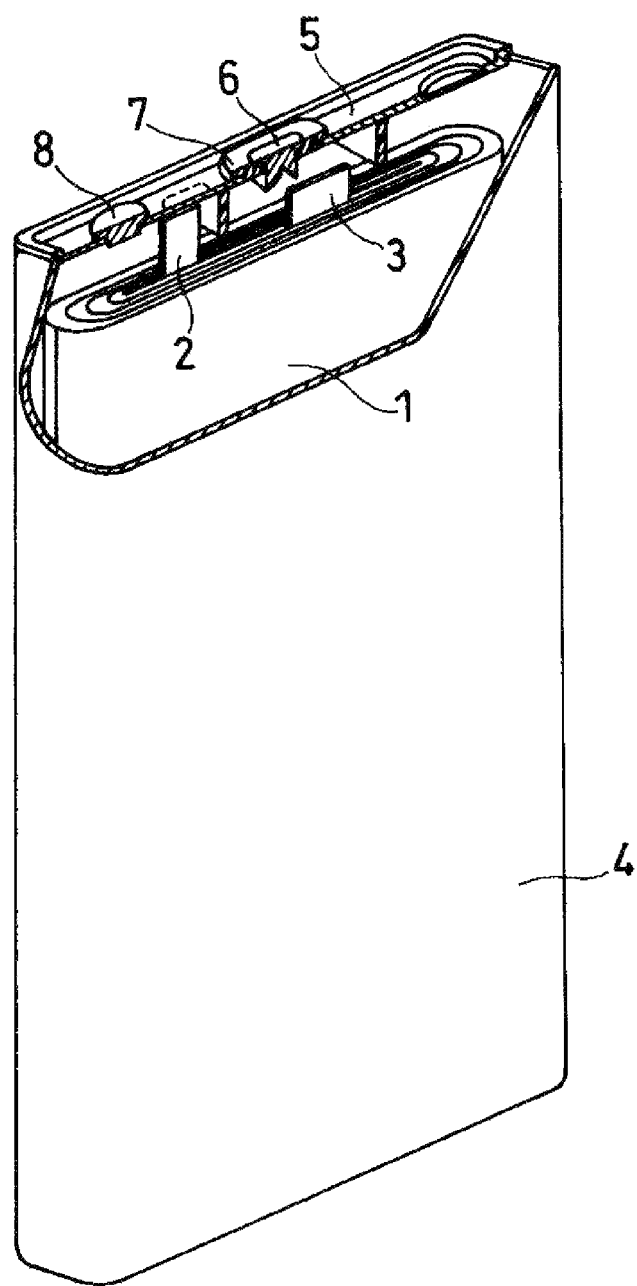
FIG. 2 is a partially cut-away schematic perspective view of a non-aqueous electrolyte secondary battery according to an embodiment of the present invention.

FIG. 2 is a partially cut-away schematic perspective view of a prismatic non-aqueous electrolyte secondary battery according to an embodiment of the present invention.

The battery includes a bottomed prismatic battery case 4, and an electrode group 1 and a non-aqueous electrolyte (not shown) that are housed in the battery case 4. The electrode group 1 includes a long strip-shaped negative electrode, a long strip-shaped positive electrode, and a separator that is interposed therebetween and prevents a direct contact therebetween. The electrode group 1 is formed by winding the negative electrode, the positive electrode, and the separator around a flat plate-shaped winding core, and pulling out the winding core.

An end of a negative electrode lead 3 is attached to a negative electrode current collector of the negative electrode through welding or the like. An end of a positive electrode lead 2 is attached to a positive electrode current collector of the positive electrode through welding or the like. The other end of the negative electrode lead 3 is electrically connected to a negative electrode terminal 6 provided on a sealing plate 5 via a gasket 7. The other end of the positive electrode lead 2 is electrically connected to the battery case 4 (the sealing plate 5) also serving as a positive electrode terminal. A resin frame body that isolates the electrode group 1 and the sealing plate 5 from each other and also isolates the negative electrode lead 3 and the battery case 4 from each other is disposed at an upper portion of the electrode group 1. Then, an opening of the battery case 4 is sealed by the sealing plate 5.

Note that the non-aqueous electrolyte secondary battery may have a cylindrical structure, a coin-shaped structure, a button-shaped structure, or the like that includes a battery case made of metal, or may be a laminated battery including a battery case made of a laminated sheet, which is a laminate of a barrier layer and a resin sheet.

Hereinafter, the present invention will be specifically described by way of examples and comparative examples. However, the present invention is not limited to the following examples.

Examples 1 to 13

[Preparation of Negative Electrode Material LSX]

Silicon dioxide and lithium carbonate were mixed such that the atomic ratio: Si/Li was 1.05, and the mixture was fired at 950° C. in the air for 10 hours, to obtain lithium silicate represented by the formula: $Li_2Si_2O_5$ (u=0.5). The obtained lithium silicate was ground so as to have an average particle size of 10 μm.

The lithium silicate ($Li_2Si_2O_5$) having an average particle size of 10 μm and the raw material silicon (3N, average particle size: 10 μm) were mixed at a mass ratio of 45:55. The mixture was placed into a pot (made of SUS, volume: 500 mL) of a planetary ball mill (P-5, manufactured by Fritsch Co., Ltd.), then 24 SUS balls (diameter: 20 mm) were placed in the pot, and the cover was closed. Then, the mixture was ground in an inert atmosphere at 200 rpm for 50 hours.

Next, the mixture in the form of powder was taken out in the inert atmosphere, and was fired at 800° C. for 4 hours in a state in which a pressure was applied thereto using a hot pressing machine in the inert atmosphere, thus obtaining a sintered body (negative electrode material LSX) of the mixture.

Thereafter, the negative electrode material LSX was ground, then passed through a mesh of 40 and thereafter the resulting LSX particles were mixed with coal pitch (MCP 250, manufactured by JFE Chemical Corporation). Then, the mixture was fired in an inert atmosphere at 800° C., and the surface of each of the LSX particles was coated with a conductive carbon, to form a conductive layer. The coating amount of the conductive layer was 5 mass % to the total mass of the LSX particles and the conductive layer. Thereafter, using a sieve, LSX particles each including a conductive layer and having an average particle size of 5 μm were obtained.

An XRD analysis of the LSX particles indicated that the crystallite size of the silicon particles calculated from the diffraction peak attributed to the Si (111) plane using the Scherrer equation was 15 nm.

As a result of analyzing the composition of the lithium silicate phase by the above-described methods (high-frequency induction heating furnace combustion-infrared absorption, inert gas fusion-nondispersive infrared absorption, and inductively coupled plasma emission spectrometry (ICP-AES)), the Si/Li ratio was 1.0, and the $Li_2Si_2O_5$ content measured by Si-NMR was 45 mass % (the content of silicon particles was 55 mass %).

[Fabrication of Negative Electrode]

The LSX particles each including the conductive layer and graphite were mixed at a mass ratio of 5:95, and the mixture was used as a negative electrode active material. The negative electrode active material, carboxymethyl cellulose sodium salt (CMC-Na), and a styrene-butadiene rubber (SBR) were mixed at a mass ratio of 97.5:1:1.5, and water was added thereto. Thereafter, the mixture was stirred using a mixer (T.K. HIVIS MIX, manufactured by PRIMIX Corporation), to prepare a negative electrode slurry. Next, the negative electrode slurry was applied to the surface of a copper foil such that the mass of the negative electrode material mixture per $m^2$ of the copper foil was 190 g, and the coated film was dried, followed by rolling, to fabricate a negative electrode in which a negative electrode material mixture layer having a density of 1.5 $g/cm^3$ was formed on both surfaces of the copper foil.

[Fabrication of Positive Electrode]

A lithium nickel composite oxide ($LiNi_{0.8}Co_{0.18}Al_{0.02}O_2$), acetylene black, and polyvinylidene fluoride were mixed at a mass ratio of 95:2.5:2.5, and N-methyl-2-pyrrolidone (NMP) was added thereto. Thereafter, the mixture was stirred using a mixer (T.K.HI-VIS MIX manufactured by PRIMIX Corporation), to prepare a positive electrode slurry. Next, the positive electrode slurry was applied to the surface of an aluminum foil, and the coated film was dried, followed by rolling, to fabricate a positive electrode in which a positive electrode material mixture layer having a density of 3.6 $g/cm^3$ was formed on both surfaces of the aluminum foil.

[Preparation of Non-Aqueous Electrolyte Solution]

As the solvent, solvent mixtures including ethylene carbonate (EC), dimethyl carbonate (DMC), and a predetermined carboxylic acid ester compound at the volume ratios shown in Table 1 were used. As the solute, LFSI and $LiPF_6$ were used in combination in the proportions shown in Table 1. A predetermined carboxylic anhydride was included in the resulting electrolyte solutions in the proportions shown in Table 1.

The following were used as the carboxylic acid ester compound.
Methyl acetate (MA)
Ethyl acetate (EA)
Propyl acetate (PA)
Methyl propionate (MP)
Ethyl propionate (EP)

Propyl propionate (PP)
Methyl butanoate (MB)
Ethyl butanoate (EB)
Propyl butanoate (PB)

The following were used as the carboxylic anhydride.

Succinic anhydride (SUA)
Maleic anhydride (MAA)
Diglycolic anhydride (DIGA)

[Fabrication of Non-Aqueous Electrolyte Secondary Battery]

A tab was attached to each of the electrodes, and the positive electrode and the negative electrode were spirally wound with a separator interposed therebetween such that the tabs were located at the outermost peripheral portion, to fabricate an electrode group. Batteries A1 to A13 were each obtained by inserting the electrode group into an outer case made of an aluminum laminate film, vacuum drying the whole at 105° C. for 2 hours, followed by injecting a non-aqueous electrolyte solution into the outer case, and sealing the opening of the outer case.

Comparative Example 1

A battery B1 of Comparative Example 1 was fabricated in the same manner as in the examples except that $LiPF_6$ was used alone as the solute, without using any carboxylic anhydride.

Comparative Example 2

A battery B2 of Comparative Example 2 was fabricated in the same manner as in the examples except that $LiPF_6$ was used alone as the solute.

Comparative Example 3

A battery B3 of Comparative Example 3 was fabricated in the same manner as in the examples except that any carboxylic anhydride was not used.

Comparative Example 4

A battery B4 of Comparative Example 4 was fabricated in the same manner as in Example 1 except that a solvent not including a carboxylic acid ester compound as shown in Table 1 was used as the solvent, and that $LiPF_6$ was used alone as the solute, without using any carboxylic anhydride.

TABLE 1

| Battery | LFSI (mol/L) | $LiPF_6$ (mol/L) | Solvent vol% | Carboxylic anhydride | Acid anhydride content (mass%) |
|---|---|---|---|---|---|
| A1  | 0.65 | 0.7  | EC/DMC/MA = 20/60/20 | SUA  | 1   |
| A2  | 0.1  | 1.25 | EC/DMC/MA = 20/60/20 | SUA  | 0.5 |
| A3  | 1.1  | 0.25 | EC/DMC/MA = 20/35/45 | SUA  | 1   |
| A4  | 0.65 | 0.7  | EC/DMC/MA = 20/20/60 | SUA  | 1   |
| A5  | 0.65 | 0.7  | EC/MA = 20/80        | SUA  | 1   |
| A6  | 0.65 | 0.7  | EC/DMC/EA = 20/60/20 | MAA  | 0.5 |
| A7  | 0.65 | 0.7  | EC/DMC/PA = 20/60/20 | DIGA | 1   |
| A8  | 0.1  | 1.25 | EC/DMC/MP = 20/75/5  | SUA  | 1   |
| A9  | 0.1  | 1.25 | EC/DMC/EP = 20/60/20 | SUA  | 1   |
| A10 | 0.65 | 0.7  | EC/DMC/PP = 20/60/20 | SUA  | 1   |
| A11 | 0.65 | 0.7  | EC/DMC/MB = 20/35/45 | SUA  | 0.5 |
| A12 | 1.1  | 0.25 | EC/DMC/EB = 20/35/45 | SUA  | 0.5 |
| A13 | 1.1  | 0.25 | EC/PB = 20/80        | SUA  | 1   |
| B1  | 0    | 1.35 | EC/DMC/MA = 20/60/20 | —    | 0   |
| B2  | 0    | 1.35 | EC/DMC/MA = 20/60/20 | SUA  | 1   |
| B3  | 0.65 | 0.7  | EC/DMC/MA = 20/60/20 | —    | 0   |
| B4  | 0    | 1.35 | EC/DMC = 20/80       | —    | 0   |

[Evaluation 1: Analysis of Electrolyte Solution in Battery]

For each of the fabricated batteries, in a 25° C. environment, constant current charge was performed with a current of 0.3 It (800 mA) until a voltage of 4.2 V was reached, and then constant voltage charge was performed with a constant voltage of 4.2 V until a current of 0.015 It (40 mA) was reached. Then, constant current discharge was performed with a current of 0.3 It (800 mA) until a voltage of 2.75 V was reached.

A rest period of 10 minutes was interposed between charge and discharge, and charge/discharge was repeated for 5 cycles under the above-described charge/discharge conditions. Thereafter, each battery was taken out and disassembled, and the components of the electrolyte solution were analyzed by gas chromatography-mass spectrometry (GCMS).

The GCMS measurement conditions used for analysis of the electrolyte solution were as follows.

Apparatus: GC17A, GCMS-QP5050A, manufactured by SHIMADZU CORPORATION
Column: HP-1 (film with a thickness of 1.0 μm and a length of 60 m) manufactured by Agilent Technologies Japan, Ltd.
Column temperature: 50° C.→110° C. (5° C./min, 12 min hold)→250° C. (5° C./min, 7 min hold)→300° C. (10° C./min, 20 min hold)
Split ratio: 1/50
Linear velocity: 29.2 cm/s
Inlet temperature: 270° C.
Injection amount: 0.5 μL
Interface temperature: 230° C.
Mass range: m/z=30 to 400 (SCAN mode), m/z=29, 31, 32, 43, 45, 60 (SIM mode)

As a result of the analysis, the presence of a carboxylic anhydride was confirmed in each of the batteries A1 to A13, and B2.

The batteries A1 to A13 of Examples 1 to 13 and the batteries B1 to B4 of Comparative Examples 1 to 4 were evaluated by the following method. The results of the evaluation are shown in Table 2

[Evaluation 2: Capacity Retention Rate During 45° C.-Cycling]

In a 45° C. environment, charge/discharge was repeated under the same charge/discharge conditions as those in Evaluation 1. The percentage of the discharge capacity at the 250th cycle to the discharge capacity at the 1st cycle was determined as the capacity retention rate (R45).

[Evaluation 3: Capacity Retention Rate During 25° C.-Cycling]

In a 25° C. environment, charge/discharge was repeated under the same charge/discharge conditions as those in Evaluation 1. The percentage of the discharge capacity at the 250th cycle to the discharge capacity at the 1st cycle was determined as the capacity retention rate (R25).

[Evaluation 4: Reaction Resistance]

After repeating charge/discharge for 5 cycles under the same charge/discharge conditions as those in Evaluation 1, the reaction resistance of each battery in a state of charge of 50% (SOC 50%) was determined by AC impedance measurement in a 25° C. environment.

From a comparison between Comparative Examples 1 and 4 in Table 2, it can be understood that, at about 25° C., the cycle characteristics are significantly improved when the electrolyte solution including a carboxylic acid ester is used. On the other hand, it can be understood that, at a high temperature of about 45° C., the capacity retention rate is rather higher when no carboxylic acid ester is included, and the cycle characteristics are significantly reduced when the electrolyte solution including a carboxylic acid ester is used. However, as shown in the results for the batteries A1 to A13, it can be understood that a high capacity retention rate can be achieved even at 45° C. when the electrolyte solution including a carboxylic anhydride and a sulfonyl imide compound is used.

In contrast to the foregoing, as can be seen from a comparison between Comparative Examples 1 and 2, almost no improvement in the capacity retention rate was observed at 45° C. when the electrolyte solution including a carboxylic anhydride and not including any sulfonyl imide compound was used. This result agrees with the difference between the reaction resistances, and presumably arises from the fact that the carboxylic anhydride has formed the high-resistance coating A on the negative electrode surface.

In addition, as can be seen from a comparison between Comparative Examples 1 and 3, no significant improvement in the capacity retention rate was observed at 45° C. also when the electrolyte solution including a sulfonyl imide compound and not including any carboxylic anhydride is used. This result also substantially agrees with the difference between the reaction resistances.

TABLE 2

| Battery | LFSI (mol/L) | Solvent vol % | Carboxylic anhydride | 45° C. 250 cycle R45 (%) | 25° C. 250 cycle R25 (%) | Reaction resistance (mΩ) |
|---|---|---|---|---|---|---|
| A1 | 0.65 | EC/DMC/MA = 20/60/20 | SUA | 91 | 92 | 12.2 |
| A2 | 0.1 | EC/DMC/MA = 20/60/20 | SUA | 90 | 90 | 12.5 |
| A3 | 1.1 | EC/DMC/MA = 20/35/45 | SUA | 89 | 90 | 12.7 |
| A4 | 0.65 | EC/DMC/MA = 20/20/60 | SUA | 85 | 86 | 12.3 |
| A5 | 0.65 | EC/MA = 20/80 | SUA | 80 | 89 | 12.1 |
| A6 | 0.65 | EC/DMC/EA = 20/60/20 | MAA | 90 | 89 | 12.5 |
| A7 | 0.65 | EC/DMC/PA = 20/60/20 | DIGA | 90 | 90 | 12.4 |
| A8 | 0.1 | EC/DMC/MP = 20/75/5 | SUA | 86 | 81 | 12.5 |
| A9 | 0.1 | EC/DMC/EP = 20/60/20 | SUA | 89 | 90 | 12.3 |
| A10 | 0.65 | EC/DMC/PP = 20/60/20 | SUA | 90 | 90 | 12.7 |
| A11 | 0.65 | EC/DMC/MB = 20/35/45 | SUA | 89 | 91 | 12.9 |
| A12 | 1.1 | EC/DMC/EB = 20/35/45 | SUA | 89 | 90 | 12.6 |
| A13 | 1.1 | EC/PB = 20/80 | SUA | 79 | 90 | 12.8 |
| B1 | 0 | EC/DMC/MA = 20/60/20 | — | 52 | 86 | 12.0 |
| B2 | 0 | EC/DMC/MA = 20/60/20 | SUA | 55 | 80 | 14.6 |
| B3 | 0.65 | EC/DMC/MA = 20/60/20 | — | 63 | 88 | 13.1 |
| B4 | 0 | EC/DMC = 20/80 | — | 90 | 52 | — |

In the batteries A1 to A13, the reaction resistance is considerably low as compared with both the batteries B2 and B3. This result indicates that each of the hybrid coatings derived from both a carboxylic anhydride and a sulfonyl imide compound has a reaction resistance that is considerably lower than those of the coatings A and B, and has a specific property.

INDUSTRIAL APPLICABILITY

With the non-aqueous electrolyte secondary battery according to the present invention, it is possible to achieve good cycle characteristics even at a high temperature of about 45° C. The non-aqueous electrolyte secondary battery according to the present invention is useful as a main power source for mobile communication devices, mobile electronic devices, and the like.

REFERENCE SIGNS LIST

1 . . . Electrode group
2 . . . Positive electrode lead
3 . . . Negative electrode lead
4 . . . Battery case
5 . . . Sealing plate
6 . . . Negative electrode terminal
7 . . . Gasket
20 . . . LSX particle
21 . . . Lithium silicate phase
22 . . . Silicon particle
23 . . . Base particle
24 . . . Conductive layer

The invention claimed is:

1. A non-aqueous electrolyte secondary battery comprising:
a positive electrode, a negative electrode, a separator interposed between the positive electrode and the negative electrode, and an electrolyte solution,
wherein the electrolyte solution includes a solvent, a solute, and a carboxylic anhydride,
the solvent includes a carboxylic acid ester compound,
the solute includes a sulfonyl imide compound,
a proportion of the carboxylic acid ester compound in the solvent is 5 vol % to 20 vol %,
the sulfonyl imide compound includes lithium bis(fluorosulfonyl)imide: $LiN(SO_2F)_2$, and
the negative electrode includes a composite material including a lithium silicate phase and silicon particles dispersed in the lithium silicate phase.

2. The non-aqueous electrolyte secondary battery according to claim 1,
wherein a content of the carboxylic anhydride in the electrolyte solution is 3 mass % or less.

3. The non-aqueous electrolyte secondary battery according to claim 1,
wherein a content of the sulfonyl imide compound in the electrolyte solution is 0.1 mol/L to 1.1 mol/L.

4. The non-aqueous electrolyte secondary battery according to claim 1,
wherein the carboxylic anhydride includes at least one selected from the group consisting of succinic anhydride, maleic anhydride, and a diglycolic anhydride.

5. The non-aqueous electrolyte secondary battery according to claim 1,
wherein a content of the silicon particles in the composite material is 30 mass % or more.

6. The non-aqueous electrolyte secondary battery according to claim 1,
wherein a composition of the lithium silicate phase is represented by the formula: $Li_ySiO_z$, and satisfies $0<y\leq 8$ and $0.5\leq z\leq 6$.

7. The non-aqueous electrolyte secondary battery according to according to claim 1,
wherein the carboxylic acid ester compound includes a lower ester compound represented by $R^1CO-OR^2$,
$R^1$ is a hydrogen atom (H) or an alkyl group having 1 to 3 carbon atoms, and
$R^2$ is an alkyl group having 1 to 3 carbon atoms.

8. A non-aqueous electrolyte secondary battery comprising:
a positive electrode, a negative electrode, a separator interposed between the positive electrode and the negative electrode, and an electrolyte solution,
wherein the electrolyte solution includes a solvent and a solute,
the solvent includes a carboxylic acid ester compound,
the solute includes a sulfonyl imide compound,
the negative electrode includes a coating derived from a sulfonyl imide compound and a carboxylic anhydride,
a proportion of the carboxylic acid ester compound in the solvent is 5 vol % to 20 vol %,
the sulfonyl imide compound includes lithium bis(fluorosulfonyl)imide: $LiN(SO_2F)_2$, and
the negative electrode includes a composite material including a lithium silicate phase and silicon particles dispersed in the lithium silicate phase.

9. A method for producing a non-aqueous electrolyte secondary battery, comprising the steps of:
assembling an uncharged battery including a positive electrode, a negative electrode, a separator interposed between the positive electrode and the negative electrode, and an electrolyte solution,
wherein the electrolyte solution comprises:
a solvent, a solute, and a carboxylic anhydride,
wherein the solvent includes a carboxylic acid ester compound,
the solute includes a sulfonyl imide compound,
a proportion of the carboxylic acid ester compound in the solvent is 5 vol % to 20 vol %,
the sulfonyl imide compound includes lithium bis(fluorosulfonyl)imide: $LiN(SO_2F)_2$, and
the negative electrode includes a composite material including a lithium silicate phase and silicon particles dispersed in the lithium silicate phase.

10. The method for producing a non-aqueous electrolyte secondary battery according to claim 9,
wherein a content of the carboxylic anhydride is 3 mass % or less.

* * * * *